United States Patent
Hingmire et al.

(10) Patent No.: US 10,810,376 B2
(45) Date of Patent: Oct. 20, 2020

(54) MARKOV LOGIC NETWORKS BASED ALIAS LINKS IDENTIFICATION AND CANONICAL MENTION SELECTION IN TEXT

(71) Applicant: Tata Consultancy Services Limited, Mumbai (IN)

(72) Inventors: Swapnil Vishbeshwar Hingmire, Pune (IN); Sangemeshwar Suryakant Patil, Pune (IN); Sachin Sharad Pawar, Pune (IN); Girish Keshav Palshikar, Pune (IN); Vasudeva Varma Kalidindi, Hyderabad (IN); Pushpak Bhattacharyya, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 120 days.

(21) Appl. No.: 16/293,413

(22) Filed: Mar. 5, 2019

(65) Prior Publication Data

US 2019/0347325 A1 Nov. 14, 2019

(30) Foreign Application Priority Data

May 10, 2018 (IN) .............................. 201821017648

(51) Int. Cl.
*G06F 40/295* (2020.01)
*G06F 16/35* (2019.01)
*G06N 7/00* (2006.01)
*G06F 40/253* (2020.01)

(52) U.S. Cl.
CPC ............ *G06F 40/295* (2020.01); *G06F 16/35* (2019.01); *G06F 40/253* (2020.01); *G06N 7/005* (2013.01)

(58) Field of Classification Search
CPC ............................... G06F 40/295; G06F 40/30
See application file for complete search history.

(56) References Cited

U.S. PATENT DOCUMENTS

| | | | |
|---|---|---|---|
| 8,478,732 B1 | 7/2013 | Chang et al. | |
| 9,092,416 B2 | 7/2015 | Liang et al. | |
| 9,535,902 B1 | 1/2017 | Michalak et al. | |
| 2010/0076972 A1* | 3/2010 | Baron .................... | G06F 40/295 707/736 |
| 2012/0036130 A1* | 2/2012 | Light .................... | G06F 40/295 707/736 |

\* cited by examiner

*Primary Examiner* — Huyen X Vo
(74) *Attorney, Agent, or Firm* — Finnegan, Henderson, Farabow, Garrett & Dunner LLP (57) ABSTRACT

Text analysis, specifically, narratives, wherein identification of distinct and independent participants (entities of interest) in a narrative is an important task for many NLP applications. This task becomes challenging because these participants are often referred to using multiple aliases. Identifying aliases of participants in a narrative is crucial for NLP applications. Existing conventional methods are supervised for alias identification which requires a large amount of manually annotated (labeled) data and are also prone to errors. Embodiments of the present disclosure provide systems and methods that implement Markov Logic Network (MLN) to encode linguistic knowledge into rules for identification of aliases for aliases mention identification using proper nouns, pronouns or noun phrases with common noun headword.

20 Claims, 4 Drawing Sheets

MARKOV LOGIC NETWORKS BASED ALIAS LINKS IDENTIFICATION AND CANONICAL MENTION SELECTION IN TEXT

PRIORITY CLAIM

This U.S. patent application claims priority under 35 U.S.C. § 119 to: India Application No. 201821017648, filed on May 10, 2018. The entire contents of the aforementioned application are incorporated herein by reference.

TECHNICAL FIELD

The disclosure herein generally relates to natural language processing techniques, and, more particularly, to Markov Logic Networks (MLN) based alias links identification and canonical mention selection in text.

BACKGROUND

Text analysis, specifically, narratives, wherein identification of distinct and independent participants (entities of interest) in a narrative is an important task for many NLP applications. This task becomes challenging because these participants are often referred to using multiple aliases. In the context of narrative analysis, a participant is defined as an entity of type PERSON (PER), LOCATION (LOC), or ORGANIZATION (ORG). A participant has a canonical mention, which is a standardized reference to that participant. Further, it may have several aliases, which are different mentions referring to the same participant. Identifying aliases of participants in a narrative is crucial for many NLP applications such as timeline creation, Question-Answering (QA), summarization, information extraction, and the like. Most of the existing or conventional methods focus on identification of aliases of pronouns and named entities, and because of which the performance may not be up to the mark for narratives that also include generic noun phrases. Further, these existing conventional methods are supervised for alias identification which requires a large amount of manually annotated (labeled) data and hence they exert extensive human efforts and cost.

SUMMARY

Embodiments of the present disclosure present technological improvements as solutions to one or more of the above-mentioned technical problems recognized by the inventors in conventional systems. For example, in one aspect, there is provided a processor implemented method for alias links identification and canonical mention selection in text, comprising: receiving, via one or more processors, an input text comprising one or more sentences; identifying, using a natural language processing technique, one or more participants from the input text, wherein the one or more participants comprises at least one of one or more of named mentions, one or more pronoun mentions, one or more common noun mentions; determining, using a co-reference detection technique, a plurality of alias links between the participants; identifying in a Markov Logic Networks (MLN), using a MLN based alias detection technique, one or more corrected alias links from the determined plurality of alias links, for each of the one or more participants by applying one or more pre-defined MLN rules on the one or more of named mentions, one or more pronoun mentions, one or more common noun mentions, wherein the one or more pre-defined MLN rules are representation of linguistic knowledge; identifying one or more independent mentions and one or more dependent mentions based on one or more dependency links identified between words in the one or more sentences of the input text; generating one or more composite mentions for each of the one or more independent mentions by merging corresponding one or more dependent mentions from the one or more dependent mentions; and generating one or more canonical mentions using the one or more corrected alias links.

In an embodiment, the one or more common noun mentions are identified using one or more ontologies. In an embodiment, the method may further comprise clustering the one or more independent mentions into one or more groups using the one or more corrected alias links.

In an embodiment, the method may further comprise selecting a canonical mention from the one or more independent mentions for each of the one or more groups. In an embodiment, the canonical mention is a named mention or a common noun mention. In an embodiment, a first mention amongst the one or more mentions in each group is selected as the canonical mention. In another embodiment, a mention having maximum number of words is selected from the one or more mentions in each group as the canonical mention. In an embodiment, the one or more pre-defined MLN rules are applied based on an associated weightage.

In another aspect, there is provided a system for alias links identification and canonical mention selection in text, comprising: a memory storing instructions and one or more modules; one or more communication interfaces; and one or more hardware processors coupled to the memory via the one or more communication interfaces, wherein the one or more hardware processors are configured by the instructions to: receive an input text comprising one or more sentences; identify, using a natural language processing technique, one or more participants from the input text, wherein the one or more participants comprises at least one of one or more of named mentions, one or more pronoun mentions, one or more common noun mentions; determine, using a co-reference detection technique, a plurality of alias links between the participants; identify in a Markov Logic Networks (MLN), using a MLN based alias detection technique, one or more corrected alias links from the determined plurality of alias links, for each of the one or more participants by applying one or more pre-defined MLN rules on the one or more of named mentions, one or more pronoun mentions, one or more common noun mentions, wherein the one or more pre-defined MLN rules are representation of linguistic knowledge; identify one or more independent mentions and one or more dependent mentions based on one or more dependency links identified between words in the one or more sentences of the input text; generate one or more composite mentions for each of the one or more independent mentions by merging corresponding one or more dependent mentions from the one or more dependent mentions; and generate one or more canonical mentions using the one or more corrected alias links.

In an embodiment, the one or more common noun mentions are identified using one or more ontologies. In an embodiment, the hardware processors are further configured by the instructions to cluster the one or more independent mentions into one or more groups using the one or more corrected alias links; and select a canonical mention from the one or more independent mentions for each of the one or more groups.

In an embodiment, the canonical mention is a named mention or a common noun mention. In an embodiment, a first mention amongst the one or more mentions in each group is selected as the canonical mention. In another embodiment, a mention having maximum number of words is selected from the one or more mentions in each group as the canonical mention. In an embodiment, the one or more pre-defined MLN rules are applied based on an associated weightage.

In yet another aspect, there is provided one or more non-transitory machine readable information storage mediums comprising one or more instructions which when executed by one or more hardware processors causes receiving, via one or more processors, an input text comprising one or more sentences; identifying, using a natural language processing technique, one or more participants from the input text, wherein the one or more participants comprises at least one of one or more of named mentions, one or more pronoun mentions, one or more common noun mentions; determining, using a co-reference detection technique, a plurality of alias links between the participants; identifying in a Markov Logic Networks (MLN), using a MLN based alias detection technique, one or more corrected alias links from the determined plurality of alias links, for each of the one or more participants by applying one or more pre-defined MLN rules on the one or more of named mentions, one or more pronoun mentions, one or more common noun mentions, wherein the one or more pre-defined MLN rules are representation of linguistic knowledge; identifying one or more independent mentions and one or more dependent mentions based on one or more dependency links identified between words in the one or more sentences of the input text; generating one or more composite mentions for each of the one or more independent mentions by merging corresponding one or more dependent mentions from the one or more dependent mentions; and generating one or more canonical mentions using the one or more corrected alias links.

In an embodiment, the one or more common noun mentions are identified using one or more ontologies. In an embodiment, the method may further comprise clustering the one or more independent mentions into one or more groups using the one or more corrected alias links.

In an embodiment, the instructions which when executed by the hardware processors may further cause selecting a canonical mention from the one or more independent mentions for each of the one or more groups. In an embodiment, the canonical mention is a named mention or a common noun mention. In an embodiment, a first mention amongst the one or more mentions in each group is selected as the canonical mention. In another embodiment, a mention having maximum number of words is selected from the one or more mentions in each group as the canonical mention. In an embodiment, the one or more pre-defined MLN rules are applied based on an associated weightage.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As discussed above, identifying aliases of participants in a narrative is crucial for many NLP applications like timeline creation, Question-Answering (QA), summarization, and Information Extraction. For instance, to answer a question (in the context of below narrative of step 2) When did Napoleon defeat the royalist rebels?, Napoleon and the young lieutenant are needed to be identified as aliases of Napoleon Bonaparte. Similarly, timeline for Napoleon Bonaparte will be inconsistent with the text, if the young lieutenant is not identified as an alias Napoleon Bonaparte. This will further affect any analysis of the timeline (e.g., refer Harsimran Bedi, Sangameshwar Patil, Swapnil Hingmire, and Girish Palshikar. 2017. Event timeline generation from history textbooks. In Proceedings of the 4th Workshop on Natural Language Processing Techniques for Educational Applications (NLPTEA 2017). pages 69-77).

Below is an exemplary narrative as discussed above:

[Napoleon Bonaparte]P1 was quite [a short man]A1 just five feet three inches tall. When [he]A1 was nine years old, [his parents]P2 sent [him]A1 to [a military school in France]P3. In 1785, [he]A1 became [a lieutenant] A1. When the Revolution broke out, [Napoleon]A1 joined [the army of the new government]P4. When [royalist rebels]P5 marched on [the National Convention]P6, [a government official]P7 told [the young lieutenant]A1 to defend [the delegates]P8.

Above is an example narrative excerpt with only independent participant mentions marked. For i-th participant, canonical mention is marked with Pi and all its aliases are marked with Ai.

As mentioned above, in context of narrative analysis, a participant is defined as an entity of type PERSON (PER), LOCATION (LOC), or ORGANIZATION (ORG). A participant has a canonical mention which is a standardized reference to that participant (e.g., Napoleon Bonaparte). Further, it may have several aliases, which are different mentions referring to the same participant.

A basic participant mention can be a sequence of proper nouns (e.g., Napoleon or N. Bonaparte), a pronoun (e.g., he) or a generic NP1 (e.g., a short man or the young lieutenant). Independent basic mentions of a participant play primary role in the narrative. Dependent basic mentions play supporting role by qualifying or elaborating independent basic mentions. For each independent mention, present disclosure takes all its dependent mentions and merge them to create its composite mention; e.g., in the above narrative, for the independent mention parents, its dependent mention his is merged to get the composite mention his parents.

The present disclosure and its embodiments focus on identification of independent mentions (basic as well as composite) for any participant in a narrative. The problem of identifying aliases of participants is challenging because even though the standard NLP toolkits work well to resolve the co-references among pronouns and named entities, it is observed that their performance for generic NPs is not up to the mark. For instance, existing natural language processing tools do not identify the young lieutenant and Napoleon Bonaparte as the same participant; one of the tasks that the present disclosure aims to do. This task can be considered as a sub-problem of the standard co-reference resolution. The present disclosure builds upon output from any standard co-reference resolution technique, and improves it (significantly) by producing experimental results to detect the missing aliases.

The present disclosure identifies the canonical mentions of all independent participants and their aliases. The present disclosure and its embodiments propose and implement a linguistically grounded technique for alias detection. The proposed technique utilizes one or more ontologies (e.g., WordNet hypernym structure) for identifying participant mentions. The proposed technique further encodes linguistic knowledge in the form of first order logic rules and performs inference in Markov Logic Networks (MLN) for establishing alias relations among these mentions.

Existing initial work on alias detection restricts the focus on aliases of named entities which occur as proper nouns (Sapena et al., 2007; Hsiung et al., 2005—refer 'Emili Sapena, Llu'is Padr'o, and Jordi Turmo. 2007. Alias Assignment in Information Extraction. Procesamiento del Lenguaje Natural 39.') using lexical, semantic, and social network analysis. This ignores the aliases which occur as generic NPs. Even in the co-reference resolution, recently (Peng et al., 2015a, b—refer 'Haoruo Peng, Kai-Wei Chang, and Dan Roth. 2015a. A Joint Framework for Coreference Resolution and Mention Head Detection. In CoNLL 2015' and 'Haoruo Peng, Daniel Khashabi, and Dan Roth. 2015b. Solving Hard Coreference Problems. In NAACL HLT 2015.') the focus has come back to generic NP aliases by detecting mention heads. Peng et al. (2015b) proposes a notion of Predicate Schemas to capture interaction between entities at predicate level and instantiate them using knowledge sources like Wikipedia®. These instances of Predicate Schemas are then compiled into constraints in an Integer Linear Programming (ILP) based formulation to resolve co-references. In addition to pronouns, the proposed technique of the present disclosure also focuses on identification of common noun based aliases of a participant using MLN.

In a nutshell, the present disclosure proposes an approach based on linguistic knowledge for identification of aliases mentioned using proper nouns, pronouns or noun phrases with common noun headword. The present disclosure and its systems and methods use Markov Logic Network (MLN) to encode the linguistic knowledge for identification of aliases. The system and method was implemented and four diverse history narratives of varying complexity were evaluated (refer experimental results). It is noted that the proposed method(s) by the present disclosure achieves better results than the state of the art (or conventional) approaches as well as a combination of standard named entity recognition and co-reference resolution techniques in terms of performance.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
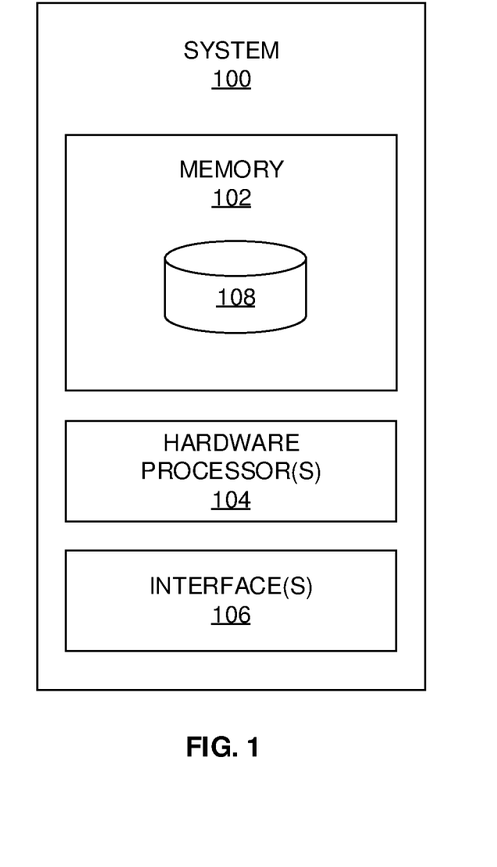
FIG. 1 illustrates an exemplary block diagram of a system for alias link(s) identification and canonical mention selection in text using Markov Logic Networks (MLN) in accordance with an embodiment of the present disclosure.

FIG. 1 illustrates an exemplary block diagram of a system 100 for alias link(s) identification and canonical mention selection in text using Markov Logic Networks (MLN) in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information pertaining to input text (e.g., a narrative) obtained from one or more users (or other sources—e.g., websites, articles, and the like). Further, the database 102 may store information pertaining to pre-processing of input text (e.g., pre-processed input text) wherein the input text (or narrative) comprises one or more participants. Furthermore, the database 108 includes information pertaining to alias links identification/determination, and suggestions on addition or removal or alias links from the determined alias links to obtain corrected alias links. Moreover, the database 108 stores information pertaining to inputs fed to the system 100 and/or outputs generated by the system (e.g., dependency links identification, participants identification, alias links determined, correction by the MLN the alias links that are determined, identifying independent mention(s) and dependent mention(s), composite mention(s) generation, canonical mention(s) generation and selection thereof) specific to the methodology described herein.

Figure 2:
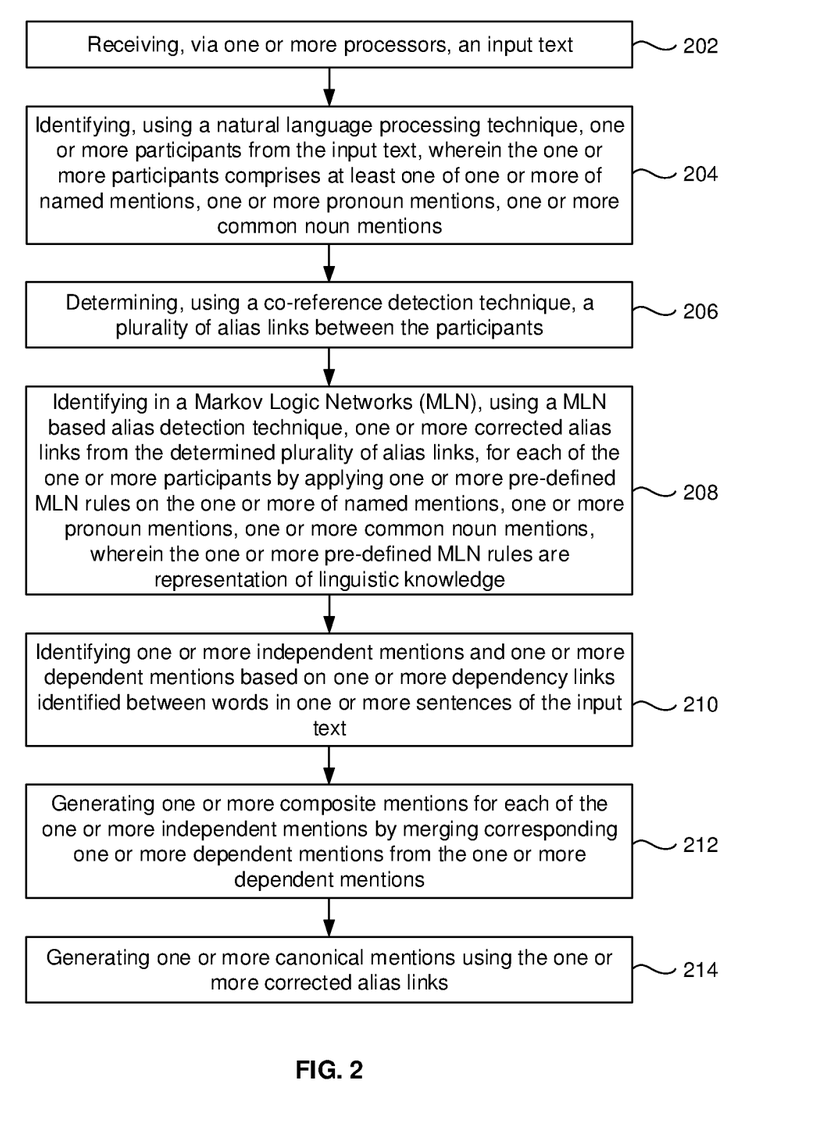
FIG. 2 is an exemplary flow diagram illustrating a method for alias link(s) identification and canonical mention selection in text using Markov Logic Networks (MLN) and the system of FIG. 1 in accordance with an embodiment of the present disclosure.

FIG. 2, with reference to FIG. 1, is an exemplary flow diagram illustrating a method for alias link(s) identification and canonical mention selection in text using Markov Logic Networks (MLN) and the system 100 of FIG. 1 according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, the flow diagram of FIG. 2, Unified Linguistic Denotation Graphs (ULDG) of FIGS. 3-4. In an embodiment of the present disclosure, at step 202, the one or more hardware processors 104 receive an input text for example, narrative. An illustrative narrative is provided by way of example below:

"Napoleon Bonaparte was quite a short man just five feet three inches tall. When he was nine years old, his parents sent him to a military school in France. In 1785, he became a lieutenant. When the Revolution broke out, Napoleon joined the army of the new government. When royalist rebels marched on the National Convention, a government official told the young lieutenant to defend the delegates"

In an embodiment of the present disclosure, at step 204, the one or more hardware processors 104 identify, using a natural language processing technique, one or more participants from the input text/narrative. In an embodiment of the present disclosure, the one or more participants comprises at least one of one or more named mentions, one or more pronoun mentions, one or more common noun mentions. The natural language processing technique comprises a named entity recognition technique (e.g., Stanford CoreNLP technique) for identifying the one or more named mentions, in an example embodiment. In an embodiment, the one or more named mentions comprise but are not limited to Napoleon, Bonaparte, France, and the like as depicted in the above exemplary narrative.

In an example embodiment, the one or more pronoun mentions are identified using a dictionary. In another embodiment, the one or more pronoun mentions comprise but are not limited to, his, him, and the like as depicted in the above exemplary narrative.

In an example embodiment, the one or more common noun mentions are identified using one or more ontologies (e.g., WordNet, DBpedia, and the like). WordNet is a dictionary comprising a list of meaning(s) in a particular order (or also referred as a lexical database for the English language). In another embodiment, the one or more common noun mentions comprise but are not limited to, man, school, and the like as depicted in the above exemplary narrative.

Figure 3:
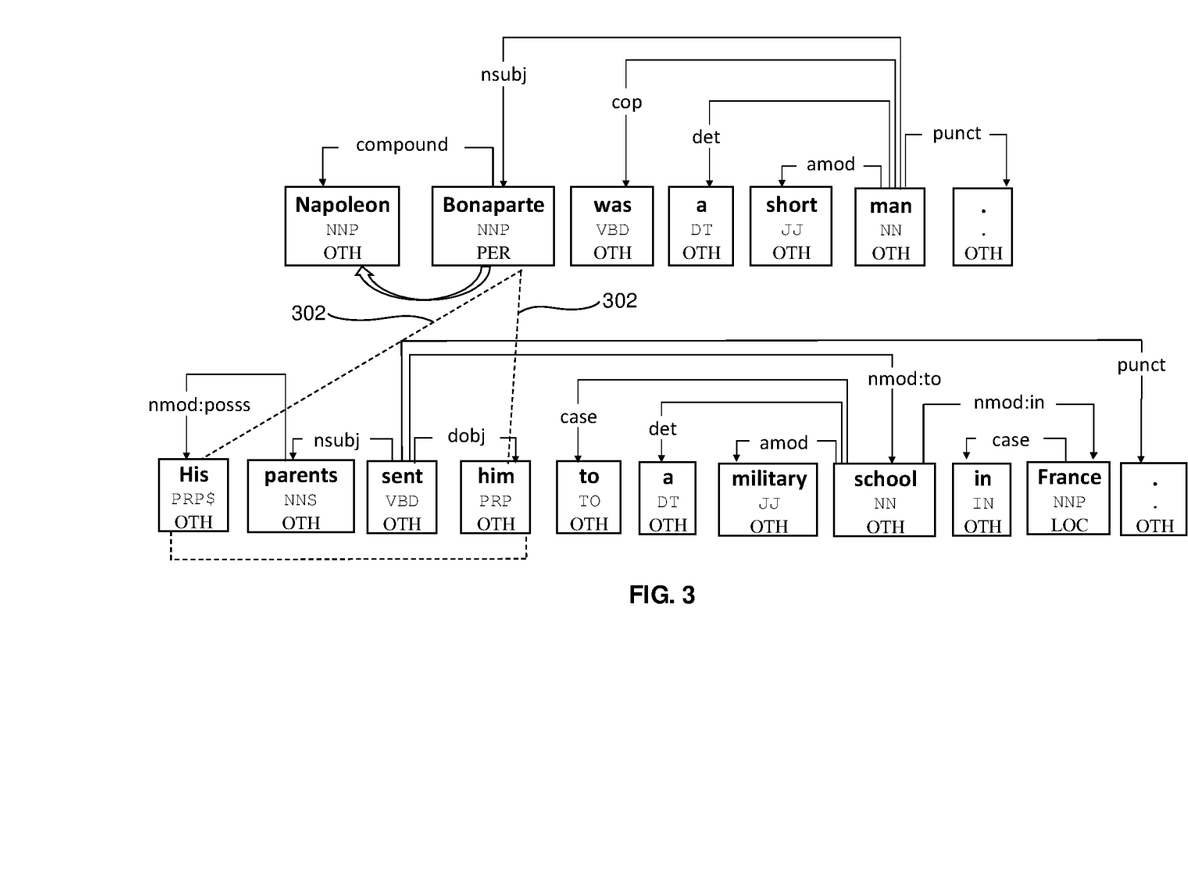
FIG. 3 illustrates a Unified Linguistic Denotation Graphs (ULDG) depicting a partial output of identified participants in accordance with an embodiment of the present disclosure.
Figure 4:
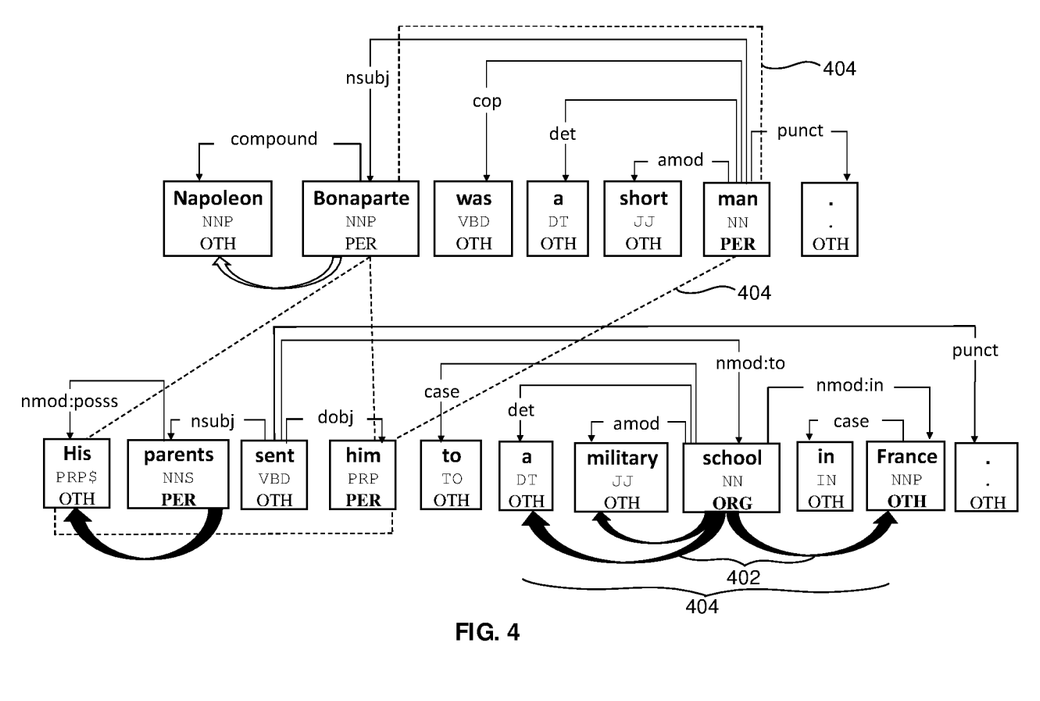
FIG. 4 illustrates a Unified Linguistic Denotation Graphs (ULDG) depicting a full list of identified participants and associated alias links in accordance with an embodiment of the present disclosure.

FIG. 3 illustrates the Unified Linguistic Denotation Graphs (ULDG) depicting a partial output of identified participants. More particularly, FIG. 3 depict input ULDG initialized with Named-entity recognition (NER) and Co-reference. (Note: alias edges (or alias) (Ea) are shown using dotted lines; participant edges (Ep) are shown using thick arrows; dependency edges or dependency links (Ed) are shown using thin labelled arrows—refer step 210 on how dependency links are identified). FIG. 4, with reference to FIGS. 1 through 3, illustrates a Unified Linguistic Denotation Graphs (ULDG) depicting a full list of identified participants. More specifically, arrows (e.g., thick arrows) 402 depict one or more participant links. Along with identified participants in FIG. 4, FIG. 4 further depicts participant type for each identified participant in the full list. For example, participant types of 'man and school are changed to PER and ORG respectively; type of 'France' is changed to OTH (or LOC wherein LOC may be referred as location).

In an embodiment of the present disclosure, at step 206, the one or more hardware processors 104 determine, using a co-reference detection technique, a plurality of alias links between the participants. In an embodiment of the present disclosure, dotted lines (302) in FIG. 3 and FIG. 4 depict the plurality of alias links between the participants. In an embodiment of the present disclosure, the co-reference detection technique is a Stanford CoreNLP technique.

In an embodiment of the present disclosure, at step 208, the one or more hardware processors 104 identify in a Markov Logic Networks (MLN), using a MLN based alias detection technique, one or more corrected alias links from the determined plurality of alias links, for each of the one or more participants by applying one or more pre-defined MLN rules on at least one of the one or more of named mentions, the one or more pronoun mentions, and the one or more common noun mentions. The one or more pre-defined MLN rules are representation of linguistic knowledge in an example embodiment. In an embodiment of the present disclosure, the step of identifying one or more corrected alias links from the determined plurality of alias links may include suggesting by the MLN addition of new alias links or removal of incorrect alias links. FIG. 4 in addition to depicting participant type for each identified participant in the full list also depicts new alias links suggested by the MLN. In an embodiment of the present disclosure, the new alias links suggested by the MLN are depicted by dotted arrows 404. Below table (Table 1) depicts illustrative predicates for generating one or more MLN rules:

TABLE 1

| Predicates | Description |
| --- | --- |
| NEType(x, y) | y is entity type of participant x |
| CopulaConnect(x, y) | Participants x and y are connected through a copula verb or a "copula-like" verb (e.g., become) |
| Conj(x, y) | Participants x and y are connected by a conjunction |
| DiffVerbConnect(x, y) | Participants x and y are connected through a "differentiating" verb or a copula-like verb (e.g., tell) |
| LexSim(x, y) | Participants x and y are lexically similar, i.e., having low edit distance |
| Alias(x, y) | Participants x and y are aliases of each other (used as a query predicate) |

Below table (Table 2) depicts illustrative one or more MLN rules generated using the above one or more predicates from Table 1:

TABLE 2

| Rules | Description |
| --- | --- |
| Alias(x, x) | Reflexivity of aliases |
| Alias(x, y) $\Rightarrow$ Alias(y, x) | Symmetry of aliases |
| Alias(x, y) $\wedge$ Alias(y, z) $\Rightarrow$ Alias(x, z) | Transitivity of aliases |
| Alias(x, y) $\wedge \neg$ Alias(y, z) $\Rightarrow \neg$ Alias(x, z) | |
| Alias(x,y) $\Rightarrow$ (NEType(x, z) $\Leftrightarrow$ NEType(y, z)) | If 'x' and 'y' are aliases of each other, then their entity types should be same |

TABLE 2-continued

| Rules | Description |
| --- | --- |
| CopulaConnect(x, y) ⇒ Alias(x, y) | If x and y are connected though a copula or copula-like verb, then they are aliases of each other |
| LexSim(x, y) ⇒ Alias(x, y) | If x and y are lexically similar, then they are likely to be aliases |
| Conj(x, y) ⇒ ¬ Alias(x, y) | If x and y are conjuncts, then they are less likely to be aliases of each other |
| DiffVerbConnect(x, y) ⇒¬ Alias(x, y) | If x and y are subjects/objects of a "differentiating" verb, then they are not likely to be aliases of each other |

Above MLN rules are better understood by way of (non-limiting) examples illustrated below:

For instance, rule Alias(x, x) refers to: 'x' is an alias of itself. Similarly, rule Alias(x, y) refers to: if 'x' is an alias of 'y' then 'y' is also an alias of 'x'. Similarly, for instance, rule Alias(x, y)∧Alias(y, z)⇒Alias(x, z) refers to: if 'y' is an alias of 'x' and 'z' is an alias of 'y' then 'z' is an alias of 'x'. Likewise, rule Alias(x, y)∧¬Alias(y, z)⇒¬Alias(x, z) refers to: if 'y' is an alias of 'x' and 'z' is not an alias of 'y' then 'z' is not an alias of 'x'.

Further, rule Alias(x, y)⇒(NEType(x, z)⇔NEType(y, z)) refers to: if 'x' and 'y' are aliases of each other then their participant types are identical. For example, 'Napoleon was a short man', here both 'Napoleon' and 'short man' have the same participant type (i.e., PERSON).

Similarly, rule CopulaConnect(x, y)⇒Alias(x, y) refers to and is explained by way of (non-limiting) example as: if 'x' and 'y' are connected though a copula or copula-like verb, then they are aliases of each other. For example, consider sentences: 1) Napoleon was a short man and 2) Napoleon became the king of France. In the first example 'Napoleon' is connected to 'a short man' through a copula verb 'was' hence they are aliases of each other. Similarly in the second example, 'Napoleon' and 'the king of France' are aliases of each other as they are connected by copula-like verb 'became'.

Further, rule LexSim(x, y)⇒Alias(x, y) refers to and is explained by way of (non-limiting) example as: if 'x' and 'y' are lexically similar, then they are likely to be aliases. For instance, 'John Doe' and 'Mr. Doe' are lexically similar to each other, hence they are likely to be aliases of each other.

Furthermore, rule Conj(x, y)⇒¬Alias(x, y) refers to and is explained by way of (non-limiting) example as: if 'x' and 'y' are conjuncts, then they are less likely to be aliases of each other. For example, consider a sentence: John and Mary went to school. In this sentence, John and Mary are connected by conjunction 'and'. The present disclosure hypothesizes that a writer (who has written the above sentence/script in a narrative) connects two participants using conjunction when they are not aliases of each other. Based on this hypothesis, it is assumed that 'John' and 'Mary' are not likely to be aliases of each other.

Moreover, rule DiffVerbConnect(x, y)⇒¬Alias(x, y) refers to and is explained by way of (non-limiting) as: if 'x' and 'y' are subjects/objects of a "differentiating" verb, then they are not likely to be aliases of each other. Consider an example sentence: John married Mary. In this sentence 'married' is a differentiating verb. In this context, the present disclosure hypothesizes that a writer uses a differentiating verb to connect two participants when they are not aliases of each other. Hence in the example sentence John and Mary are not likely to be aliases of each other. In the above examples, 'x' and 'y' are referred as participant(s)/entity.

In an embodiment of the present disclosure, the one or more pre-defined MLN rules are applied based on an associated weightage. The associated weightage may be assigned by users or domain experts, wherein the MLN rules are utilized by the MLN based on corresponding weightage). The MLN rules are assigned weightage based on domain knowledge acquired by the domain expert.

In an embodiment of the present disclosure, at step 210, the one or more hardware processors 104 identify one or more independent mentions and one or more dependent mentions based on one or more dependency links identified between words in the one or more sentences of the input text. In an embodiment, the one or more dependency links are identified using a dependency parser (e.g., Stanford CoreNLP technique), in an example embodiment. In an embodiment, both the independent mentions and dependent mentions comprise of at least one of the one or more named mentions, the one or more pronoun mentions, and the one or more common noun mentions.

Below is an illustrative example of dependency links identification with reference to FIG. 3. In an embodiment of the present disclosure, FIG. 3, with reference to FIGS. 1-2, illustrates a Unified Linguistic Denotation Graphs (ULDG) depicting dependency links identified between words in sentences of the above exemplary narrative. More specifically, continuous arrows (e.g., from 'Napoleon' to 'Bonaparte' indicated by expression 'compound', from 'Bonaparte' to 'man' indicated by expression 'nsubj', from 'was' to 'man' indicated by expression 'cop', from 'a' to 'man' indicated by expression 'det', from 'short' to 'man' indicated by expression 'amod', and from 'man' to 'period symbol (.)' indicated by symbol 'punct') depict dependency links. Similarly, continuous arrows (e.g., from 'his' to 'parents' indicated by expression 'nmod:posss', from 'sent' to 'parents' indicated by expression 'nsubj', from 'sent' to 'him' indicated by expression 'dobj', from 'sent' to 'period symbol (.)' indicated by symbol 'punct', from 'sent' to 'school' indicated by expression 'nmod:to', from 'school' to 'to' indicated by expression 'case', from 'school' to 'a' indicated by expression 'det', from 'school' to 'military' indicated by expression 'amod', from 'school' to 'France' indicated by expression 'nmod:in', and from 'France' to 'in' indicated by expression 'case'). The expression 'nsubj' refers to 'nominal subject' is a dependency type relation obtained using dependency parse of that particular sentence (e.g., in this case the sentence is 'Napoleon Bonaparte was a short man'). Similarly, the expression 'nmod:in' refers to 'nominal modifier:in' is a dependency type relation obtained using dependency parse of that particular sentence (e.g., in this case the sentence is 'His parents sent him to a military school in France'). Amongst the above dependency type relations, some of them are useful for merging the dependent participants with mentions of independent participants. For example, 'France' is a dependent participant of the independent mention 'a military school', and the dependency type relation 'nmod:in' helps (or enables) the system 100 to identify this dependent participant. It is to be understood and noted by a person having ordinary skill in the art or by person skilled in the art that only few dependency type relations are described by way of examples (e.g., 'nsubj' and 'nmod:in') and other dependency type relations will have corresponding definition(s) and these examples of dependency type relations shall not be construed as limiting the scope of the present disclosure.

Thick arrows 402 in FIG. 4 depict the one or more independent mentions and the one or more dependent mentions. In particular, in FIG. 4, 'a military school' is an identified independent mention and 'France' is a dependent mention. For the sake of brevity, only the above 2 examples: 'a military school' and 'France' are discussed and identified as independent mention and dependent mention respectively.

In an embodiment of the present disclosure, at step 212, the one or more hardware processors 104 generate one or more composite mentions for each of the one or more independent mentions by merging corresponding one or more dependent mentions from the one or more dependent mentions. Thick arrows 402 in FIG. 4 depict composite mentions. For instance, composite mention 'a military school in France' is generated for the independent mention 'a military school' by merging the independent mention 'a military school' with its corresponding dependent mention(s) which in this case are 'in' and 'France'.

In an embodiment of the present disclosure, at step 214, the one or more hardware processors 104 generate one or more canonical mentions using the one or more corrected alias links. For instance, as can be depicted in FIG. 4, 'Napoleon Bonaparte' is generated as a canonical mention in an example embodiment by the MLN.

In an embodiment of the present disclosure, the one or more hardware processors 104 are further configured by the instructions to cluster the one or more independent mentions into one or more groups using the one or more corrected alias links. By referring to FIG. 4, the independent mentions 'Napoleon Bonaparte', 'him', and 'a short man' are grouped together to form a group (say group 1), 'a military school in France' is formed as another group (say group 2).

In an embodiment of the present disclosure, the one or more hardware processors 104 are further configured by the instructions to select a canonical mention from the one or more independent mentions for each of the one or more groups. In other words, the hardware processors 104 utilize corresponding one or more mentions comprised in each group to select a canonical mention for that particular group. In an embodiment of the present disclosure, the canonical mention is a named mention or a common noun mention. In other words, the canonical mention can only be a named mention or a common noun mention and not a pronoun mention.

In an embodiment of the present disclosure, a first mention (or a first non-pronoun mention) amongst the one or more mentions in each group is selected as the canonical mention. For instance, 'Napoleon Bonaparte' is selected as the canonical mention for group 1. It should be understood that at times, a named mention or a common noun mention may not be appearing as a first word or a second word in a particular group and rather may be appearing as a third word. In such cases, the third word becomes a first mention (or a first non-pronoun mention) that gets selected as a canonical mention.

Alternatively, in the present disclosure, the one or more hardware processors 104 are further configured by the instructions to select a mention (non-pronoun mention or longest mention) that has a maximum number of words from the one or more mentions in each group as the canonical mention. For instance, 'a military school in France' is selected as the canonical mention for group 2. The expression 'longest mention' refers to a mention having maximum number of words, in an example embodiment.

Below is a summary and approach of the above explanation provided by the present disclosure:

The approach as discussed in the present disclosure has been broadly classified in three phases: (I) Identification of participants, (II) MLN based formulation to identify aliases, and (III) Composite mention creation. The systems and methods of the present disclosure use a Unified Linguistic Denotation Graph (ULDG) representation of NLP-processed sentences in the input narrative (e.g., refer FIGS. 3 and 4). The ULDG unifies output from various stages of NLP pipeline such as dependency parsing, NER and co-reference resolution.

Definition: A ULDG G(V,Ed,Ep,Ea), corresponding to a set S of n sentences, is a vertex labeled and edge-labeled graph. A node u E V corresponds to a token in S and its label is defined as: $L_u$=(s, t, token, POS, p, a); where s: sentence index, t: token index, token, POS: part of speech tag of token, p denotes participant type (p E {PER,ORG,LOC, OTH}) if u is a headword of a participant mention and a denotes canonical participant mention of corresponding group of aliases. There are three types of edges:

Ed={<u, v, dep>: directed dependency edge labelled with dep (dependency relation), which connects a governor (parent) token u to its dependent token v}; e.g., <sent, parent, nsubj>.

Ep={<u,v>: directed edge, which connects headword u of a participant phrase to its each constituent word v}; e.g., <Bonaparte, Napoleon>.

Ea={<u,v>: undirected edge, which connects node u and v which are headwords of aliases of the same participants}; e.g., <him, Bonaparte>.

Below is an illustrated pseudo code provided by way of example and implemented by the systems and methods of the present disclosure and its embodiments:

```
input: G=ULDG for set of sentences S
output: G with updated participant and alias edges (or alias links)
// Phase-I: Basic participant mention identification
foreach n ∈ G.nodes do
    if n.POS is noun ∧ n.p = OTH ∧
        is_generic_NP_head(G,n) then
            n.p: = checkWordNetHypernyms(n.token)
            if n.p = OTH then continue
            foreach < n,x,dep > ∈ Ed do
                if dep ∈ {amod, compound, det}
                    then Ep := Ep∪{< n,x >}
foreach n ∈ G.nodes do
    if n.POS is pronoun ∧ (∃x:n,x > ∈ Ea such that x.p ≠ OTH)
G := resolveParticipantTypeConflict(G)
// Phase-II: MLN-based alias detection
Ea := Ea∪{< u,v >: where u and v are detected as aliases
    by MLN_encoded_linguistic_Constraints( )}
// Phase-III: Composite mention creation by merging dependent participant
    mentions
G'(V',E') := Subgraph of G, such that
    V' := {n ∈ G:n.p ≠ OTH} and
    E' = {n < u,v,dep > ∈ Ed:dep ∈ {appos, nmod}}
foreach n ∈ G.nodes do
    if n.p = OTH then continue
    indParticipant := True
    foreach < x,n,dep > ∈ Ed do
        if dep ∈ {appos, nmod} ∧ x.p ≠ OTH
            then indParticipant := False
    if ¬indParticipant then continue
    depParticipants := DFS(G',n)
    foreach y ∈ depParticipants do
        Ep := Ep∪{< n,y >}
        foreach < y,x > ∈ Ep do
            Ep := Ep∪{< n,x >}
        y.p := OTH
        Drop from Ep all outgoing edges (links) from y
    foreach Clique c in subgraph (V,Ea) ⊂ G do
```

-continued

```
foreach n ∈ c.nodes do
    n.a:=earliest participant mention in c.nodes
```

The proposed methodology/approach has been summarized in above pseudo code: Its input is an ULDG G(V,Ed, Ep,Ea) for a set S of given sentences. V,Ed,Ep,and Ea were initialized using a dependency parser (e.g., Stanford CoreNLP technique), NER and co-reference resolution technique.

The proposed pseudo code modifies the input ULDG in-place by updating node labels, Ep and Ea. FIG. 3 shows an example of initialized input ULDG, which gets transformed by the proposed pseudo code to the output ULDG shown in FIG. 4. The above 3 phases are discussed below:

Phase-I: In this phase, participant type of headword h of a generic NP is updated if its WordNet hypernyms contain PER/ORG/LOC indicating synsets. A new Ep edges (alias link) was added from h to dependent nodes of h (with dependency relations compound, amod or det) to get corresponding mention boundaries.

The function resolveParticipantTypeConflict( ) ensures that participant types of all nodes in a single clique in Ea are same by giving higher priority to NER-induced type than WordNet-induced type.

Phase-II: In this phase, linguistic rules are encoded in MLN to add new Ea edges (alias links). The predicates and key first-order logic rules are described in Table 2 depicted above. Here, Alias(x,y) is the only query predicate. Others are evidence predicates, whose observed groundings are specified using G.

Phase-Ill: In this phase, an auxiliary subgraph G'(V',E') ⊂ G; where V' contains only those nodes which correspond to headwords of basic participant mentions and E' contains only those edges incident on nodes in V' and labeled with appos or nmod. Each independent participant mention participant mention in G' is identified and its dependent mentions are merged using depth first search (DFS) on G'. Finally, each clique in Ea represents aliases of an unique participant. As mentioned above, an earliest non-pronoun mention in text order as the canonical mention is selected for that clique.

Experimental Analysis:

Datasets: The proposed method of FIG. 2 and its associated embodiments were evaluated on history narratives as they are replete with challenging cases of alias detection. Public narratives of varying linguistic complexity was chosen to cover a spectrum of history: (i) famous personalities: Napoleon (Nap) (Littel, 2008), and Mao Zedong (Mao) (Wikipedia, 2018), (ii) a key event: Battle of Haldighati (BoH) (Chandra, 2007), and (iii) a major phenomenon: Fascism (Fas) (Littel, 2008). These datasets were annotated (e.g., manually annotated) for the independent participant mentions and their aliases. For each alias group of participant mentions earliest non-pronoun mention was used as its canonical mention.

The proposed method was also evaluated (or implemented) on newswire subset ($ACE_{nw}$) of standard ACE 2005 dataset (Walker et al., 2006). Entity mention annotations were transformed such that only independent entity mentions and their aliases are used. Transformation of entity mention annotations is described by way of following (non-limiting) example(s). Mentions with entity types, for example, "vehicle (VEH) or weapon (WEA)" may be (or are) ignored. ACE entity types Geo-political entity (GPE), Facility (FAC) and Location (LOC) are treated as a single entity type LOC. Multiple consecutive mentions in ACE which are part of a single basic participant mention are merged and mention type of the headword is used for the whole mention. For example, in "Indian soldiers attacked terrorist camp" ACE annotates two mentions: "Indian" as Geo-political entity (GPE) and "soldiers" as person (PER); but the present disclosure and the systems and methods associated thereof transform them into a single participant mention "Indian soldiers" with entity type PER (PERSON).

B1 is a standard approach to this problem where output of NER and co-reference components of Stanford CoreNLP toolkit are combined to detect aliases. B2 is the state-of-the-art co-reference resolution system based on (Peng et al., 2015a,b). M is proposed alias detection approach (refer above pseudo code).

Evaluation: The performance of all the approaches (B1, B2, AND M) is evaluated at two levels: all independent participant mentions (i.e., participant detection) and their canonical mentions (i.e., participant linking). Standard F1 metric was used to measure performance of participant detection. For participant linking, existing research dataset (Pradhan et al., 2014—refer Sameer Pradhan, Xiaoqiang Luo, Marta Recasens, Eduard Hovy, Vincent Ng, and Michael Strube. 2014. Scoring coreference partitions of predicted mentions: A reference implementation. In Proceedings of the conference. Association for Computational Linguistics. Meeting. NIH Public Access, volume 2014, page 30.) wherein the combined performance of participant mention identification and alias detection was evaluated using the standard evaluation metrics, MUC (Vilain et al., 1995—refer Marc Vilain, John Burger, John Aberdeen, Dennis Connolly, and Lynette Hirschman. 1995. A model theoretic co-reference scoring scheme. In Proceedings of the 6th conference on Message understanding. Association for Computational Linguistics, pages 45-52.), BCUB (Bagga and Baldwin, 1998—refer Amit Bagga and Breck Baldwin. 1998. Algorithms for scoring coreference chains. In The first international conference on language resources and evaluation workshop on linguistics coreference. Granada, volume 1, pages 563-566.), Entity-based CEAF (CEAFe) (Luo, 2005—refer Xiaoqiang Luo. 2005—On coreference resolution performance metrics. In Proceedings of the conference on human language technology and empirical methods in natural language processing. Association for Computational Linguistics, pages 25-32) and their average.

Results: Below Table 3 shows that the proposed approach outperforms other baselines on all datasets. Correct identification of generic NPs as participant mentions, and accurate addition of alias edges (or alias links) due to MLN formulation lead to improved performance of Algorithm 1; e.g., in Table 1, the baselines fail to detect 'a lieutenant' as an alias for 'Napoleon Bonaparte', but the proposed approach succeeds as it exploits MLN rule.

TABLE 3

| Dataset | Approach | Participant mentions | Canonical mentions BCUB | MUC | CEAFe | Avg. |
|---|---|---|---|---|---|---|
| $ACE_{nw}$ | B1 | 53.1 | 38.3 | 49.4 | 30.3 | 39.3 |
|  | B2 | 62.9 | 45.0 | 50.2 | 42.5 | 45.9 |
|  | M | 70.9 | 52.0 | 56.7 | 50.5 | 53.1 |
| Nap | B1 | 60.5 | 49.4 | 69.4 | 32.3 | 50.4 |
|  | B2 | 73.9 | 56.4 | 70.2 | 50.1 | 58.9 |
|  | M | 86.4 | 74.1 | 79.0 | 63.6 | 72.2 |
| BoH | B1 | 61.7 | 39.9 | 56.2 | 36.2 | 44.1 |
|  | B2 | 65.6 | 45.0 | 56.9 | 40.8 | 47.6 |
|  | M | 73.5 | 50.9 | 66.9 | 46.3 | 54.7 |
| Fas | B1 | 56.8 | 40.1 | 59.3 | 31.8 | 43.7 |

TABLE 3-continued

| Dataset | Approach | Participant mentions | Canonical mentions | | | |
|---|---|---|---|---|---|---|
| | | | BCUB | MUC | CEAFe | Avg. |
| | B2 | 61.6 | 41.0 | 56.9 | 40.8 | 47.6 |
| | M | 70.3 | 55.3 | 66.9 | 46.3 | 54.7 |
| Mao | B1 | 60.1 | 47.4 | 62.4 | 38.1 | 49.3 |
| | B2 | 49.1 | 29.0 | 41.9 | 29.8 | 33.6 |
| | M | 78.9 | 64.1 | 73.9 | 60.2 | 66.1 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   receiving, via one or more processors, an input text comprising one or more sentences (202);
   identifying, using a natural language processing technique, one or more participants from the input text, wherein the one or more participants comprises at least one of one or more of named mentions, one or more pronoun mentions, one or more common noun mentions (204);
   determining, using a co-reference detection technique, a plurality of alias links between the participants (206);
   identifying in a Markov Logic Networks (MLN), using a MLN based alias detection technique, one or more corrected alias links from the determined plurality of alias links, for each of the one or more participants, by applying one or more pre-defined MLN rules on the one or more of named mentions, one or more pronoun mentions, one or more common noun mentions, wherein the one or more pre-defined MLN rules are representation of linguistic knowledge (208);
   identifying one or more independent mentions and one or more dependent mentions based on one or more dependency links identified between words in the one or more sentences of the input text (210);
   generating one or more composite mentions for each of the one or more independent mentions by merging corresponding one or more dependent mentions from the one or more dependent mentions (212); and
   generating one or more canonical mentions using the one or more corrected alias links (214).

2. The processor implemented method of claim 1, wherein the one or more common noun mentions are identified using one or more ontologies.

3. The processor implemented method of claim 1, further comprising clustering the one or more independent mentions into one or more groups using the one or more corrected alias links.

4. The processor implemented method of claim 3, further comprising selecting a canonical mention from the one or more independent mentions for each of the one or more groups.

5. The processor implemented method of claim 4, wherein the canonical mention is one of a named mention or a common noun mention.

6. The processor implemented method of claim 4, wherein a first mention amongst the one or more mentions in each group is selected as the canonical mention.

7. The processor implemented method of claim 4, wherein a mention having maximum number of words is selected from the one or more mentions in each group as the canonical mention.

8. The processor implemented method of claim 1, wherein the one or more pre-defined MLN rules are applied based on an associated weightage.

9. A system (100) comprising:
a memory (102) storing instructions and one or more modules (108);
one or more communication interfaces (106); and
one or more hardware processors (104) coupled to the memory (102) via the one or more communication interfaces (106), wherein the one or more hardware processors (104) are configured by the instructions to:
receive an input text comprising one or more sentences;
identify, using a natural language processing technique, one or more participants from the input text, wherein the one or more participants comprises at least one of one or more of named mentions, one or more pronoun mentions, one or more common noun mentions;
determine, using a co-reference detection technique, a plurality of alias links between the participants;
identify in a Markov Logic Networks (MLN), using a MLN based alias detection technique, one or more corrected alias links from the determined plurality of alias links, for each of the one or more participants, by applying one or more pre-defined MLN rules on the one or more of named mentions, one or more pronoun mentions, one or more common noun mentions, wherein the one or more pre-defined MLN rules are representation of linguistic knowledge;
identify one or more independent mentions and one or more dependent mentions based on one or more dependency links identified between words in the one or more sentences of the input text;
generate one or more composite mentions for each of the one or more independent mentions by merging corresponding one or more dependent mentions from the one or more dependent mentions; and
generate one or more canonical mentions using the one or more corrected alias links.

10. The system of claim 9, wherein the one or more common noun mentions are identified using one or more ontologies.

11. The system of claim 9, wherein the hardware processors are further configured by the instructions to cluster the one or more independent mentions into one or more groups using the one or more corrected alias links.

12. The system of claim 11, wherein the hardware processors are further configured by the instructions to select a canonical mention from the one or more independent mentions for each of the one or more groups.

13. The system of claim 12, wherein the canonical mention is one of a named mention or a common noun mention.

14. The system of claim 12, wherein a first mention amongst the one or more mentions in each group is selected as the canonical mention.

15. The system of claim 12, wherein a mention having maximum number of words is selected from the one or more mentions in each group as the canonical mention.

16. The system of claim 9, wherein the one or more pre-defined MLN rules are applied based on an associated weightage.

17. One or more non-transitory machine readable information storage mediums comprising one or more instructions which when executed by one or more hardware processors cause:
receiving, via the one or more hardware processors, an input text comprising one or more sentences;
identifying, using a natural language processing technique, one or more participants from the input text, wherein the one or more participants comprises at least one of one or more of named mentions, one or more pronoun mentions, one or more common noun mentions;
determining, using a co-reference detection technique, a plurality of alias links between the participants;
identifying in a Markov Logic Networks (MLN), using a MLN based alias detection technique, one or more corrected alias links from the determined plurality of alias links, for each of the one or more participants, by applying one or more pre-defined MLN rules on the one or more of named mentions, one or more pronoun mentions, one or more common noun mentions, wherein the one or more pre-defined MLN rules are representation of linguistic knowledge;
identifying one or more independent mentions and one or more dependent mentions based on one or more dependency links identified between words in the one or more sentences of the input text;
generating one or more composite mentions for each of the one or more independent mentions by merging corresponding one or more dependent mentions from the one or more dependent mentions; and
generating one or more canonical mentions using the one or more corrected alias links.

18. The one or more non-transitory machine readable information storage mediums of claim 17, wherein the one or more common noun mentions are identified using one or more ontologies.

19. The one or more non-transitory machine readable information storage mediums of claim 17, wherein the one or more instructions when executed by the one or more hardware processors further cause:
clustering the one or more independent mentions into one or more groups using the one or more corrected alias links; and
selecting a canonical mention from the one or more independent mentions for each of the one or more groups, wherein the canonical mention is one of a named mention or a common noun mention, wherein a first mention amongst the one or more mentions in each group is selected as the canonical mention, and wherein a mention having maximum number of words is selected from the one or more mentions in each group as the canonical mention.

20. The one or more non-transitory machine readable information storage mediums of claim 17, wherein the one or more pre-defined MLN rules are applied based on an associated weightage.

* * * * *